(12) United States Patent
Choudhury et al.

(10) Patent No.: US 10,733,499 B2
(45) Date of Patent: Aug. 4, 2020

(54) SYSTEMS AND METHODS FOR ENHANCING COMPUTER ASSISTED HIGH THROUGHPUT SCREENING PROCESSES

(71) Applicant: University of Kansas, Lawrence, KS (US)

(72) Inventors: Arunabha Choudhury, Lawrence, KS (US); Ghaith Shabsigh, Lawrence, KS (US); Swapan Chakrabarti, Lawrence, KS (US)

(73) Assignee: University of Kansas, Lawrence, KS (US)

( * ) Notice: Subject to any disclaimer, the term of this patent is extended or adjusted under 35 U.S.C. 154(b) by 1193 days.

(21) Appl. No.: 14/839,635

(22) Filed: Aug. 28, 2015

(65) Prior Publication Data
US 2016/0063372 A1    Mar. 3, 2016

Related U.S. Application Data

(60) Provisional application No. 62/044,785, filed on Sep. 2, 2014.

(51) Int. Cl.
*G06N 3/04*    (2006.01)

(52) U.S. Cl.
CPC .................................. *G06N 3/0436* (2013.01)

(58) Field of Classification Search
None
See application file for complete search history.

(56) References Cited

U.S. PATENT DOCUMENTS 6,421,612 B1    7/2002    Agrafiotis et al.
6,768,982 B1    7/2004    Collins et al.
(Continued)

FOREIGN PATENT DOCUMENTS

WO    WO2008091225    7/2008

OTHER PUBLICATIONS

Chakrabarti, Swapan, et al. "Artificial Neural Network—Based Analysis of High-Throughput Screening Data for Improved Prediction of Active Compounds." Journal of biomolecular screening 14.10 (2009): 1236-1244. (Year: 2009).*
(Continued)

*Primary Examiner* — Daniel T Pellett
(74) *Attorney, Agent, or Firm* — Ray Quinney & Nebeker P.C.; Paul N. Taylor

(57) ABSTRACT

Embodiments are directed to identifying active compounds for a targeted medium from a library of compounds. In one scenario, a computer system receives high throughput screening (HTS) data for a subset of compounds that have been HTS-screened. The computer system determines labels for a subset of compounds based on labels identified in the HTS-screened compounds as being part of an active class or part of an inactive class, access chemical features corresponding to the HTS-screened compounds, apply Fuzzy logic membership functions to calculate membership values for active and inactive compounds to determine the degree to which each compound belongs to the active class or to the inactive class, train an artificial neural network (ANN) to identify active compounds in silico based on the Fuzzy logic membership functions, and process another subset of compounds in silico to identify active and inactive compounds using the trained artificial neural network.

18 Claims, 8 Drawing Sheets

(56) References Cited

U.S. PATENT DOCUMENTS 6,813,615 B1 11/2004 Colasanti et al.
2002/0156586 A1* 10/2002 van Rhee ........... G01N 33/6872
702/19

OTHER PUBLICATIONS

Glick, Meir, et al. "Enrichment of high-throughput screening data with increasing levels of noise using support vector machines, recursive partitioning, and laplacian-modified naive bayesian classifiers." Journal of chemical information and modeling 46.1 (2006): 193-200. (Year: 2006).*
Kato, Ryuji, et al. "Novel strategy for protein exploration: high-throughput screening assisted with fuzzy neural network." Journal of molecular biology 351.3 (2005): 683-692. (Year: 2005).*
U.S. Appl. No. 16/994,115, filed Sep. 2, 2014, Choudhury et al.

* cited by examiner

SYSTEMS AND METHODS FOR ENHANCING COMPUTER ASSISTED HIGH THROUGHPUT SCREENING PROCESSES

CROSS-REFERENCE TO RELATED APPLICATIONS

This application claims priority to and the benefit of U.S. Provisional Patent Application Ser. No. 62/044,785, entitled "Systems and Methods for Enhancing Computer Assisted High Throughput Screening Processes," filed on Sep. 2, 2014, which application is incorporated by reference herein in its entirety.

BACKGROUND

Drug discovery is an expensive and time consuming process involving many different steps. The drug discovery process involves identifying potential compounds of desired effects, and then proceeds to further steps of drug design. Hundreds of thousands of chemical compounds and molecules, that are readily available at a screening facility, are tested on micro-assays using a biological target. After an incubation time, measurements are taken, and the compounds that absorbs, inhibit, stimulate, or react with the target are labeled as active.

High Throughput Screening (HTS) is a method often used in drug discovery to identify active compounds which react in a specified manner. HTS may be a first stage for drug design, and is widely used for its ability to scan a large number of compounds in a relatively short period of time. However, due to the need to screen thousands of compounds, this method is inefficient and expensive both in terms of time and overall cost.

With the ability to rapidly screen diverse compounds (such as small molecules or siRNAs) to identify active compounds, HTS has led to a substantial increase in the rate of data generated from assays of screened compounds. As a result of the increased amount of data, it may be difficult to glean biochemical significance from any particular portion of the data.

BRIEF SUMMARY

Embodiments described herein are directed to identifying active compounds for a targeted medium from a library of compounds. In one embodiment, a computer system is provided which includes a processor, system memory and a receiver that receives high throughput screening (HTS) data for a subset of compounds that have been HTS-screened. Receiving the HTS data causes the computer system to perform the following: determine labels for one or more compounds based on labels identified in the HTS-screened compounds as being part of an active class or part of an inactive class, access chemical features corresponding to the HTS-screened compounds, apply Fuzzy logic membership functions to calculate membership values for active and inactive compounds to determine how much each compound belongs to the active class or to the inactive class, train an artificial neural network (ANN) to identify active compounds in silico based on the Fuzzy logic membership functions, and process another subset of compounds in silico to identify active and inactive compounds using the trained artificial neural network.

In another embodiment, a computer system identifies active compounds for a targeted medium from a library of compounds. The computer system uses at least one known active compound and at least one known inactive compound to define a mean Fuzzy membership value for active compounds and a mean Fuzzy membership value for inactive compounds. The computer system calculates a Euclidean distance from the known active compound to the mean Fuzzy membership value for active compounds and to the mean Fuzzy membership value for inactive compounds, and calculates a Euclidean distance from the known inactive compound to the mean Fuzzy membership value for active compounds and to the mean Fuzzy membership value for inactive compounds.

The computer system further calculates at least two new Euclidean distances for the known active compound and the known inactive compound. The computer system defines a membership function for an active compound and a membership function for an inactive compound. While a variety of defined membership functions may be used, at least in some cases, the membership function may be the inverse of the natural exponential function having the exponent as the square of the Euclidian distance of the compound to the mean Fuzzy membership value for the compound. The computer system further trains an artificial neural network to predict active and inactive compounds in silico and predicts an active compound in silico using the trained artificial neural network.

In yet another embodiment, a computer system identifies classes of feature vectors. The computer system divides a dataset into at least two subsets including a first subset and a second subset, where active and inactive feature vectors are defined in the first subset. The computer system also divides the first subset further into a first group and a second group, where the first group and the second group include an approximately equal number of active and inactive feature vectors. The computer system calculates a mean of the active feature vectors and a mean of the inactive feature vectors in the first group, calculates the distance between each of the active and inactive feature vectors and the mean of the active feature vectors and the mean of the inactive feature vectors in the first group, and generates at least two new distances for a feature vector in the first group.

The computer system then uses a Fuzzy membership function to determine a membership value for each of the active and inactive feature vectors in the first group and trains multiple artificial neural networks. The training inputs to the artificial neural networks include the active and inactive feature vectors, and the training outputs include the membership values for each of the active and inactive feature vectors in the first group. The computer system further validates the training of the artificial neural networks using the second group, ranks the prediction accuracy of the artificial neural networks, and chooses at least one artificial neural network to predict in silico the class of feature vector for at least one untested feature vector in the dataset.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which.

DETAILED DESCRIPTION

Figure 1:
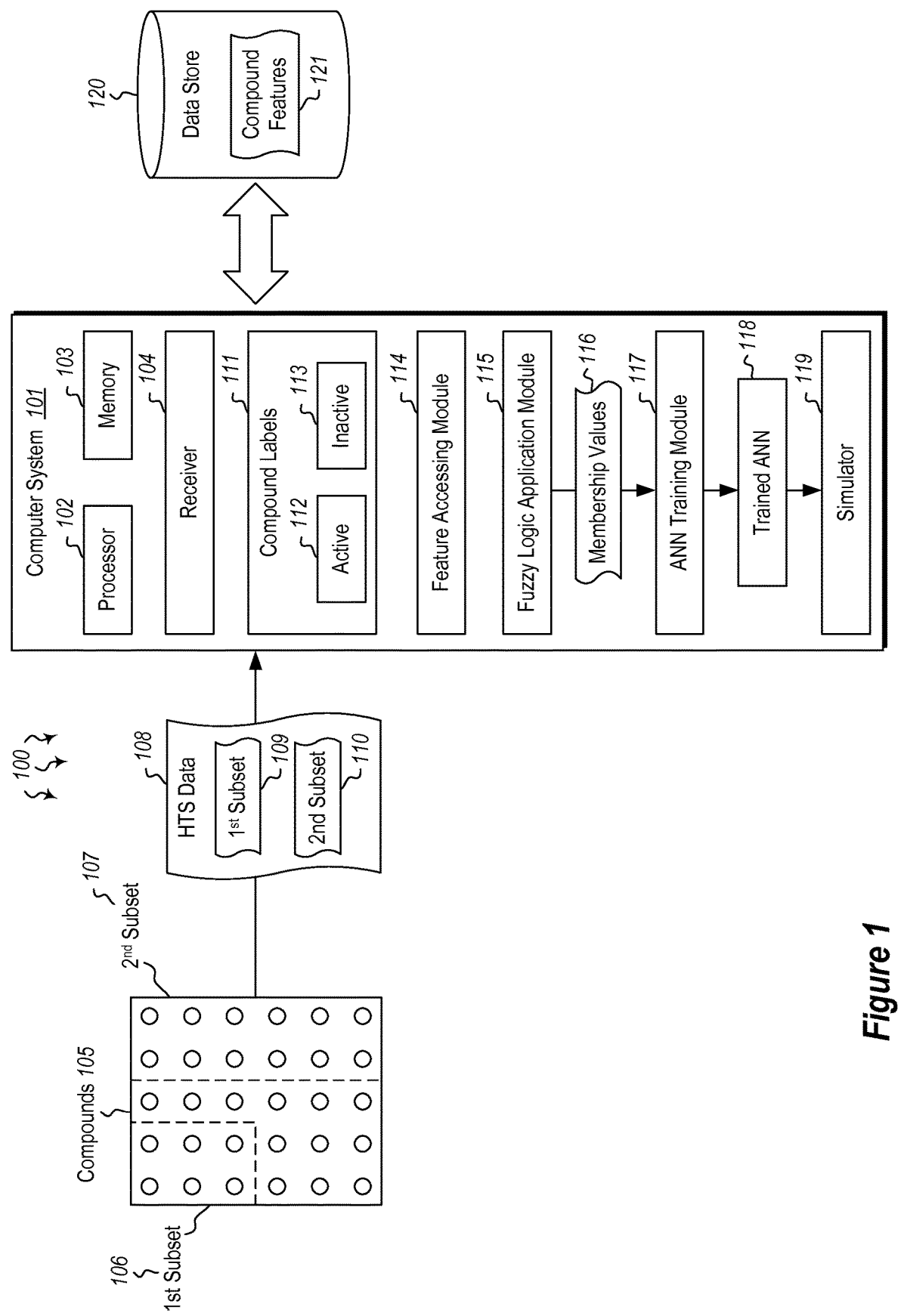
FIG. 1 illustrates a computer architecture in which embodiments described herein may operate including identifying active compounds for a targeted medium from a library of compounds and identifying classes of feature vectors.

Embodiments described herein are directed to identifying active compounds for a targeted medium from a library of compounds. In one embodiment, a computer system is provided which includes a processor, system memory and a receiver that receives high throughput screening (HTS) data for a subset of compounds that have been HTS-screened. Receiving the HTS data causes the computer system to perform the following: determine labels for one or more compounds based on labels identified in the HTS-screened compounds as being part of an active class or part of an inactive class, access chemical features corresponding to the HTS-screened compounds, apply Fuzzy logic membership functions to calculate membership values for active and inactive compounds to determine how much each compound belongs to the active class or to the inactive class, train an artificial neural network (ANN) to identify active compounds in silico based on the Fuzzy logic membership functions, and process another subset of compounds in silico to identify active and inactive compounds using the trained artificial neural network.

In another embodiment, a computer system identifies active compounds for a targeted medium from a library of compounds. The computer system uses at least one known active compound and at least one known inactive compound to define a mean Fuzzy membership value for active compounds and a mean Fuzzy membership value for inactive compounds. The computer system calculates a Euclidean distance from the known active compound to the mean Fuzzy membership value for active compounds and to the mean Fuzzy membership value for inactive compounds, and calculates a Euclidean distance from the known inactive compound to the mean Fuzzy membership value for active compounds and to the mean Fuzzy membership value for inactive compounds.

The computer system further calculates at least two new Euclidean distances for the known active compound and the known inactive compound. The computer system defines a membership function for an active compound and a membership function for an inactive compound. While a variety of defined membership functions may be used, at least in some cases, the membership function may be the inverse of the natural exponential function having the exponent as the square of the Euclidian distance of the compound to the mean Fuzzy membership value for the compound. The computer system further trains an artificial neural network to predict active and inactive compounds in silico and predicts an active compound in silico using the trained artificial neural network.

In yet another embodiment, a computer system identifies classes of feature vectors. The computer system divides a dataset into at least two subsets including a first subset and a second subset, where active and inactive feature vectors are defined in the first subset. The computer system also divides the first subset further into a first group and a second group, where the first group and the second group include an approximately equal number of active and inactive feature vectors. The computer system calculates a mean of the active feature vectors and a mean of the inactive feature vectors in the first group, calculates the distance between each of the active and inactive feature vectors and the mean of the active feature vectors and the mean of the inactive feature vectors in the first group, and generates at least two new distances for a feature vector in the first group.

The computer system then uses a Fuzzy membership function to determine a membership value for each of the active and inactive feature vectors in the first group and trains multiple artificial neural networks. The training inputs to the artificial neural networks include the active and inactive feature vectors, and the training outputs include the membership values for each of the active and inactive feature vectors in the first group. The computer system further validates the training of the artificial neural networks using the second group, ranks the prediction accuracy of the artificial neural networks, and chooses at least one artificial neural network to predict in silico the class of feature vector for at least one untested feature vector in the dataset.

The following discussion refers to a number of methods and method acts that may be performed by one or more embodiments of the subject matter disclosed herein. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments described herein may implement various types of computing systems. These computing systems are now increasingly taking a wide variety of forms. Computing systems may, for example, be mobile phones, electronic appliances, laptop computers, tablet computers, wearable devices, desktop computers, mainframes, and the like. As used herein, the term "computing system" includes any device, system, or combination thereof that includes at least one processor, and a physical and tangible computer-readable memory capable of having thereon computer-executable instructions that are executable by the processor. A computing system may be distributed over a network environment and may include multiple constituent computing systems.

A computing system typically includes at least one processing unit and memory. The memory may be physical system memory, which may be volatile, non-volatile, or some combination of the two. The term "memory" may also be used herein to refer to non-volatile mass storage such as physical storage media or physical storage devices. If the computing system is distributed, the processing, memory and/or storage capability may be distributed as well.

As used herein, the term "executable module" or "executable component" can refer to software objects, routines, methods, or similar computer-executable instructions that may be executed on the computing system. The different components, modules, engines, and services described herein may be implemented as objects or processes that execute on the computing system (e.g., as separate threads).

As described herein, a computing system may also contain communication channels that allow the computing system to communicate with other message processors over a wired or wireless network. Such communication channels may include hardware-based receivers, transmitters or transceivers, which are configured to receive data, transmit data or perform both.

Embodiments described herein also include physical computer-readable media for carrying or storing computer-executable instructions and/or data structures. Such computer-readable media can be any available physical media that can be accessed by a general-purpose or special-purpose computing system.

Computer storage media are physical hardware storage media that store computer-executable instructions and/or data structures. Physical hardware storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computing system to implement the disclosed functionality of the embodiments described herein. The data structures may include primitive types (e.g. character, double, floating-point), composite types (e.g. array, record, union, etc.), abstract data types (e.g. container, list, set, stack, tree, etc.), hashes, graphs or other any other types of data structures.

As used herein, computer-executable instructions comprise instructions and data which, when executed at one or more processors, cause a general-purpose computing system, special-purpose computing system, or special-purpose processing device to perform a certain function or group of functions. Computer-executable instructions may be, for example, binaries, intermediate format instructions such as assembly language, or even source code.

Those skilled in the art will appreciate that the principles described herein may be practiced in network computing environments with many types of computing system configurations, including, personal computers, desktop computers, laptop computers, message processors, hand-held devices, multi-processor systems, microprocessor-based or programmable consumer electronics, network PCs, mini-computers, mainframe computers, mobile telephones, PDAs, tablets, pagers, routers, switches, and the like. The embodiments herein may also be practiced in distributed system environments where local and remote computing systems, which are linked (either by hardwired data links, wireless data links, or by a combination of hardwired and wireless data links) through a network, both perform tasks. As such, in a distributed system environment, a computing system may include a plurality of constituent computing systems. In a distributed system environment, program modules may be located in both local and remote memory storage devices.

Those skilled in the art will also appreciate that the embodiments herein may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Still further, system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

Referring to the figures, FIG. 1 illustrates a computer architecture 100 in which at least one embodiment described herein may be employed. The computer architecture 100 includes a computing system 101. The computer system 101 may be any type of local or distributed computer system, including a cloud computer system. The computer system 101 includes a hardware processor 102 and hardware-based memory 103. The computer system may also have built-in data storage, and/or may have access to external data storage in data store 120. The data store 120, like the computer system 101, may be local or distributed, and may include a cloud-based data store.

The computer system 101 further includes modules for performing a variety of different functions. For instance, the receiver 104 may be configured to receive high throughput screening (HTS) data 108. The receiver 104 may receive this data via wired or wireless electronic data transfer means such as a modem or a wired or wireless network interface card (NIC). The HTS data 108 may be received in conjunction with other data related to chemical compounds 105. These chemical compounds 105 may be arranged in assay sheets for testing. Typically, the compounds 105 are tested to see whether they react when mixed with a given substance. If the compound reacts, it is labeled by the compound labeler 111 as being active. If the compound does not react, it is labeled as being inactive 113.

The compounds 105 may be arranged in substantially any manner, and may be arranged in a manner different than that shown in FIG. 1. As shown in FIG. 1, the compounds 105 may be divided into different subsets: a first subset 106 and a second subset 107. The subsets may include any number of compounds and each subset may include the same number of compounds or a different number. Moreover, the number of subsets and the number of compounds in each subset may be changed arbitrarily. The compounds may be subjected to high throughput screening, and the HTS data 108 from this screening may be transferred to the receiver 104 of computer system 101. The data for the first subset 109 and the data of the second subset 110 may be sent together, or separately, either batched or as generated by the screening process.

High throughput screening is often used for drug discovery because of its ability to screen hundreds of thousands of compounds towards a target molecule in a relatively short period of time. As mentioned above, however, blindly screening large numbers of compounds makes HTS a very expensive process. The embodiments described herein reduce the number of compounds to be screened by using a semi-automated method to eliminate a majority of the compounds in a given dataset based on their molecular features. These features may be accessed by the feature accessing module 114 of computer system 101.

As used herein, the term "dataset" refers to a library that contains many (e.g. thousands of) different compounds. The compounds from the dataset that bind with a protein or a target molecule are considered as active 112 and can be potentially used to synthesize a drug. The rest of the compounds are considered as inactive 113. Each compound can be described by its chemical features 121, such as molecular weight, number of C bonds, etc; however, different compounds may have one or more similar features which make the active and inactive compounds highly overlapping in the feature space. The embodiments described herein implement an artificial neural network (ANN) in combination with a Fuzzy logic method that is capable of identifying the majority of the active compounds and, consequently, eliminating the need to screen every compound in a dataset. As such, these embodiments reduce the cost of drug screening and the drug discovery process.

A dataset and its features 121 may be stored digitally on a storage device such as data store 120. Artificial neural networks are computational models made of an interconnected group of nodes with one or more inputs and one or more outputs. These models are implemented on computers, on digital signal processing devices, or on other electronic devices. The chemical features 121 of the compounds 105 are used to train the ANN to identify the active compounds.

Accordingly, embodiments described herein are directed to identifying active compounds for a targeted medium from a library of compounds and to identifying classes of feature vectors. In one embodiment, a computer system 101 is provided which includes a processor 102, system memory 103 and a receiver 104 that receives high throughput screening (HTS) data 108 for one or more subsets of compounds (e.g. 109, 110) that have been HTS-screened. Receiving the HTS data 108 causes the computer system 101 to perform the following: determine labels for the HTS-screened compounds indicating whether the HTS-screened compounds are part of an active class 112 or are part of an inactive class 113, access chemical features 121 corresponding to the HTS-screened compounds, apply Fuzzy logic membership functions to calculate membership values 116 for active and inactive compounds to determine the degree to which each compound belongs to the active class or to the inactive class, train an artificial neural network (ANN) 118 to identify active compounds in silico based on the Fuzzy logic membership functions, and process another subset of compounds in silico to identify active and inactive compounds using the trained artificial neural network.

As the term is used herein, "in silico" refers to performing a computer simulation. As such, if active compounds are identified or processed in silico, they are identified using a computer simulation. Accordingly, computer system 101 has a simulator 119 that performs the computer simulations. It will be understood that these simulations may occur on a single computer system (e.g. 101) or across a plurality of computer systems.

After the HTS data 108 has been received, the compounds being labeled as being active 112 or inactive 113, the feature accessing module 114 accesses one or more compound features 121 related to the compounds and uses the features as inputs to train an artificial neural network. ANNs typically include multiple interconnected layers of nodes (neurons) that represent an input layer, an output layer, and one or more of hidden layers. Each node is a simple mathematical function, usually non-linear, that sums weighted inputs and provides an output. Before the testing phase, the weights are set during a learning phase, where the ANN is taught to recognize certain patterns.

There are several methods of training an ANN, such as, self-organization, feed-forward, and back-propagation. Once the learning phase is complete, the ANN may be used to classify unlabeled data. The performance of ANNs can be further improved by integrating fuzzy logic into the learning process. Fuzzy logic uses a truth value, or a confidence level, to label observations rather than the binary logic of true and false. ANNs also deal with and rely on approximating unknown models. As such, fuzzy logic may be efficiently integrated with ANNs for this type of machine learning. Accordingly, a Fuzzy logic application module 115 may be implemented within computer system 101 to calculate membership values 116 for the compounds 105. These membership values 116 may indicate the degree to which a given compound is active 112 or inactive 113. As such, the membership values 116, along with the compound features 121 that provide characteristics of the compounds 105, may be used to train an ANN so that the ANN can be used to classify the compounds that have not been labeled.

At least in some embodiments, Fuzzy logic may be integrated with ANNs to identify the active compounds in datasets of chemical compounds. The ANNs may be trained using only a small percentage of the compounds, and may further be able to identify potential active compounds with a low number of misclassifications. Such embodiments may eliminate the need to screen every compound in a dataset which, consequently, reduces the cost of drug screening and the drug discovery process. In addition, each compound is assigned a confidence value that represents how likely the compound is to be found as active (or inactive). Implementation of these embodiments will not only decrease the cost of HTS and drug discovery, but also provide results in a timely and efficient manner.

In order to train an ANN and later use it for testing, the compounds in the dataset are represented in terms of features 121 (i.e. molecular descriptors), where the features of a compound are a set of numbers that uniquely describe that compound. In some cases, software may be used to generate hundreds of features for each compound. Of those, only a few features 121 are needed to train the ANNs. These features 121 are thus used by the ANN training module 117 of the computer system 101 to train the ANNs 118. In some embodiments, the compounds 105 may be characterized by a feature vector of 16 elements corresponding to 16 physical and chemical properties of that compound. These features may include, but are not limited to, Molecular Weight, ClogP, Molar Reactivity, Total Surface Area, Polar Surface, Volume, Polar Volume, Atom Count, Bond Count, Rotatable Counts, Ring Count, Diversity Fingerprint, Atom Pair Paths, H-bond Acceptors, H-Bond Donors and Hydrophobic Centers. Other features may be included or excluded in other embodiments.

Figure 2:
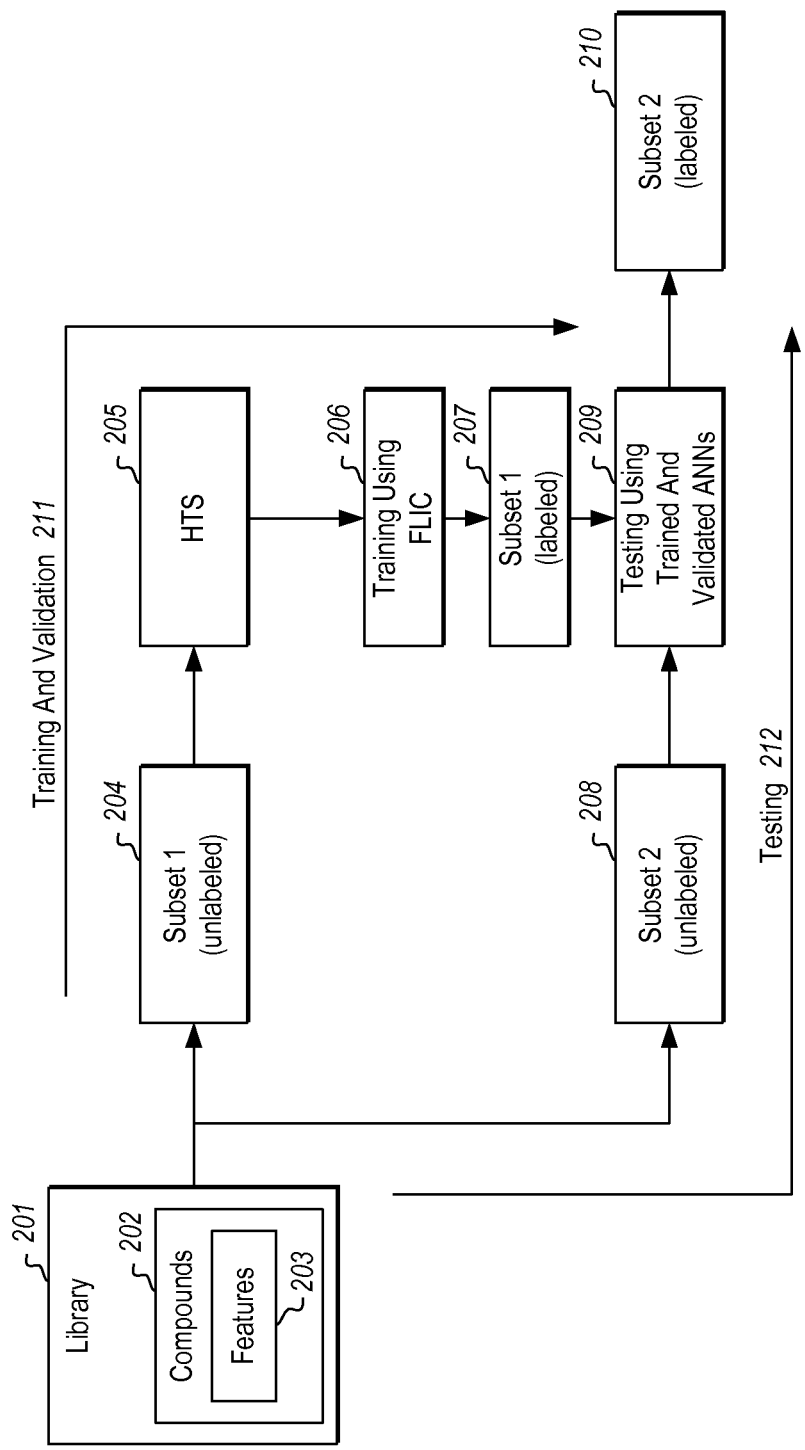
FIG. 2 illustrates a flowchart showing processes of training, validation and testing of compounds.

As shown in FIG. 2, a library 201 of compounds 202 may be provided, where each compound has corresponding features 203. This library of compounds may be used to train and test one or more artificial neural networks. For example, the training and validation steps 211 may include sending an unlabeled subset of compounds 204 (i.e. "Subset 1" 207) to the high throughput screener 205 for screening and labeling. The ANN is then trained using Fuzzy logic and interval clustering (FLIC) 206, as will be described further below. After the ANN is trained using the features and membership values of the compounds from the first group and validated using the features of the compounds from the second group, the ANN can be used to identify the active compounds in the second subset 208. In the testing phase 212, an unlabeled subset of compounds 208 (i.e. "Subset 2") is provided to the trained ANN (or ANNs). The ANN or (ANNs) then test the unlabeled Subset 2. Upon testing, a labeled Subset 2 (210) is output, without the Subset 2 ever having been subjected to HTS screening.

Thus, in this process, the original library of compounds 201 is first divided into Subsets 1 and 2, (a development set and a testing set, respectively). The development set may further be divided into training and validation subsets. Multiple ANNs may be trained using the samples selected randomly from the training subset and then validated using the compounds in the validation subset. The compounds in the training and validation subsets are randomly chosen and passed through HTS screening 205 for labeling. The compounds in the validation subset are used to validate all the trained ANNs in order to choose the top performing ANNs (e.g. the ten best ANNs).

As in the training subset, the compounds in this validation subset are also labeled as active and inactive using HTS. The testing subset has the remaining compounds. The (ten) best ANNs may be used to label the compounds in this set. In order to measure performance, the ratio of the number of active compounds found as active (i.e., truly active) is compared to the number of inactive compounds found as active (i.e., misclassified). Whichever ANNs have the most favorable ratio of truly active to misclassified compounds are selected for further processing of compounds.

Figure 3:
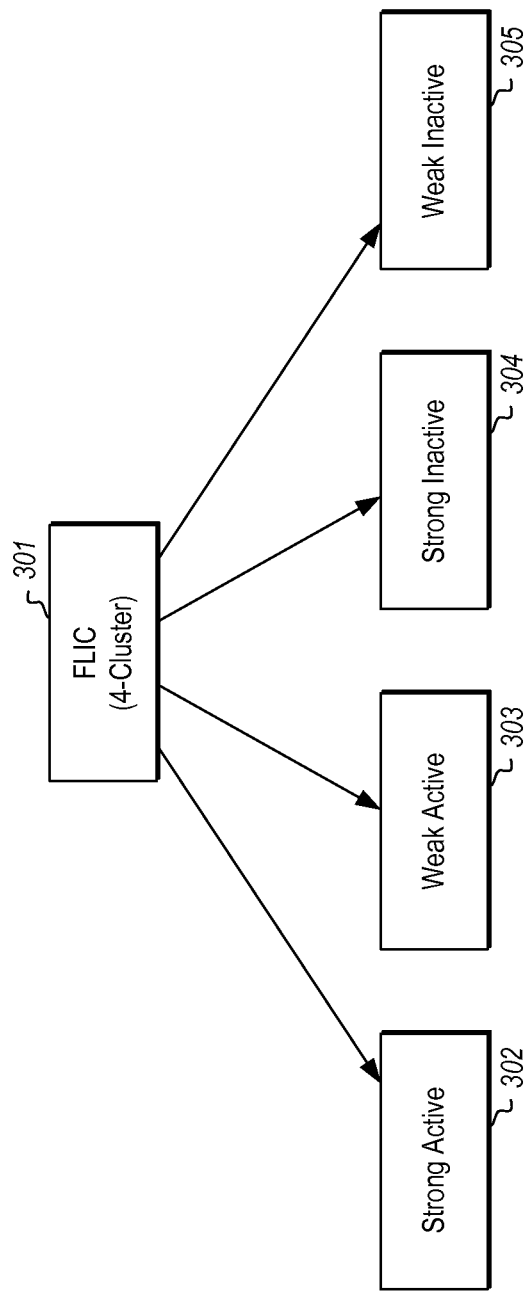
FIG. 3 illustrates a Fuzzy logic and interval clustering (FLIC) cluster with four classifications.

Returning to FIG. 1, the Fuzzy logic application module 115 of computer system 101 may be configured to generate membership values 116, indicating the degree to which each compound is active or inactive. This membership value may be calculated using one or more of the compound features 121 related to the compounds. As shown in FIG. 3, the compounds may be classified into one of four different categories indicating the degree to which each compound is active or inactive. In a 4-cluster FLIC 301, the compounds may be classified as strong active 302, weak active 303, strong inactive 304 or weak inactive 305. In larger FLIC clusters, there may be more granular indicators such as moderately active or moderately inactive, which would sit between strong or weak active/inactive. Other clusterings are also possible and may be chosen arbitrarily by a user.

The calculated membership values 116 may thus be strong active 302, weak active 303, strong inactive 304 or weak inactive 305, as shown in FIG. 3, or may have some other labeling. When calculating the membership values, the features 121 may be inputs to the ANNs, while the membership values themselves are used as outputs to train the ANN. Multiple artificial neural networks may be instantiated with random numbers of hidden layers and nodes. The ANNs are taught to identify active compounds using the HTS-screened training data, and can then be used to identify active compounds in non-screened data.

In some cases, multiple ANNs may be used together to predict, in silico, a class of feature vector for at least one untested feature vector in the HTS data 108. The computer system 101 may then verify the predicted class of feature vector for the untested feature vector. In one embodiment, the computer system 101 defines active feature vectors and inactive feature vectors in at least a portion of a dataset, finds a mean of the active feature vectors and a mean of the inactive feature vectors from the dataset. The computer system 101 further calculates the distance between the singular active feature vector and the mean of the active feature vectors and the distance between singular inactive feature vectors and the mean of the inactive feature vectors from the dataset.

Figure 4:
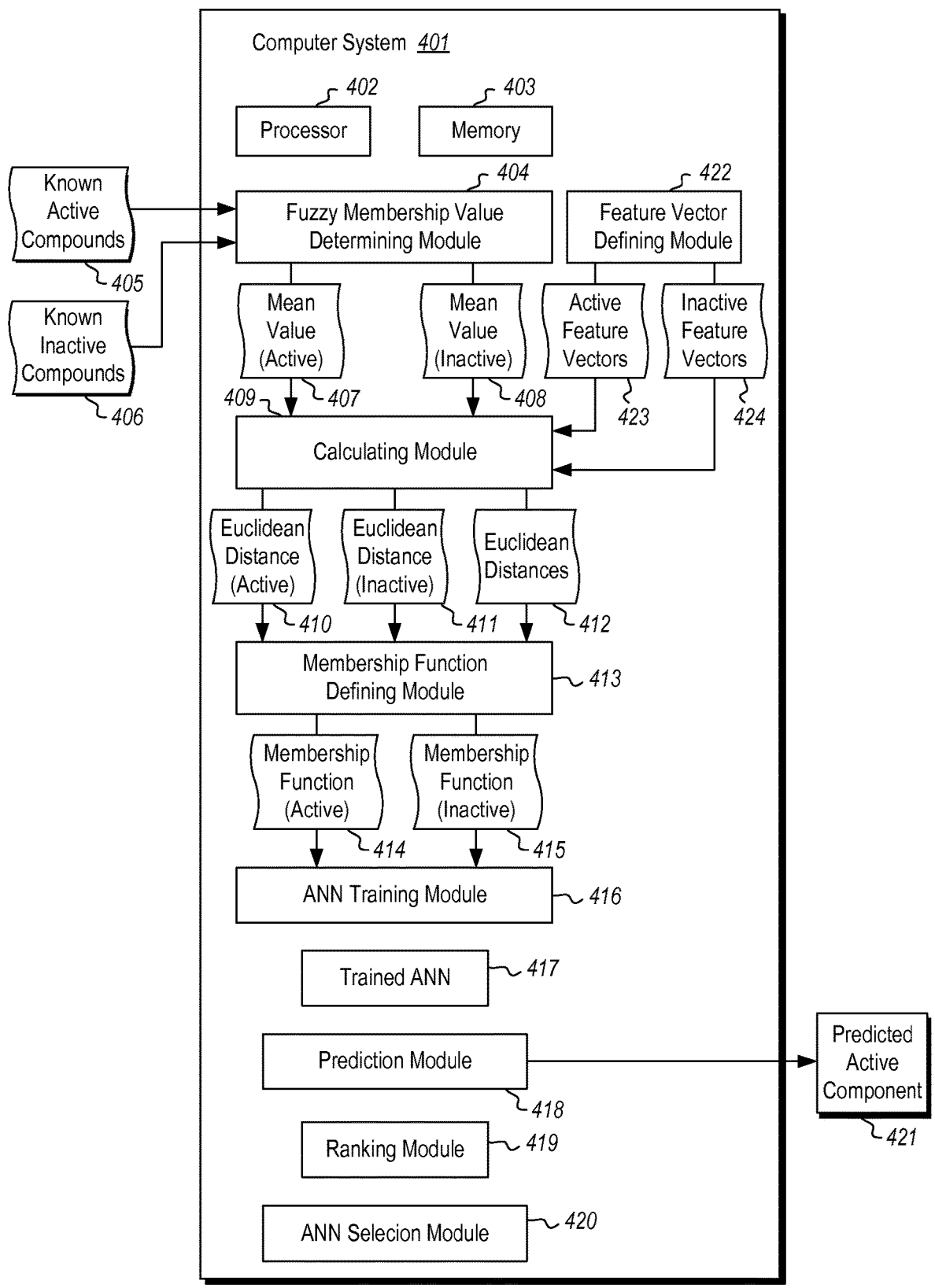
FIG. 4 illustrates an alternative computer architecture in which active compounds are identified for a targeted medium and classes of feature vectors are identified for a library of compounds.

Using this data, the computer system 101 generates at least two new distances a feature vector in the dataset, uses a Fuzzy membership function to find membership values 116 for the active feature vectors and for the inactive feature vectors in the dataset and, upon training multiple artificial neural networks, where the inputs are the active feature vectors and the inactive feature vectors and the outputs are the membership values for the active feature vectors and for the inactive feature vectors in the at least a portion of the dataset, the computer system predicts, in silico, at least one untested feature vector in the dataset to be an active feature vector using the trained plurality of artificial neural networks. These concepts will be explained further below with regard to computing environment 400 of FIG. 4, and methods 500 and 600 of FIGS. 5 and 6, respectively.

Figure 5:
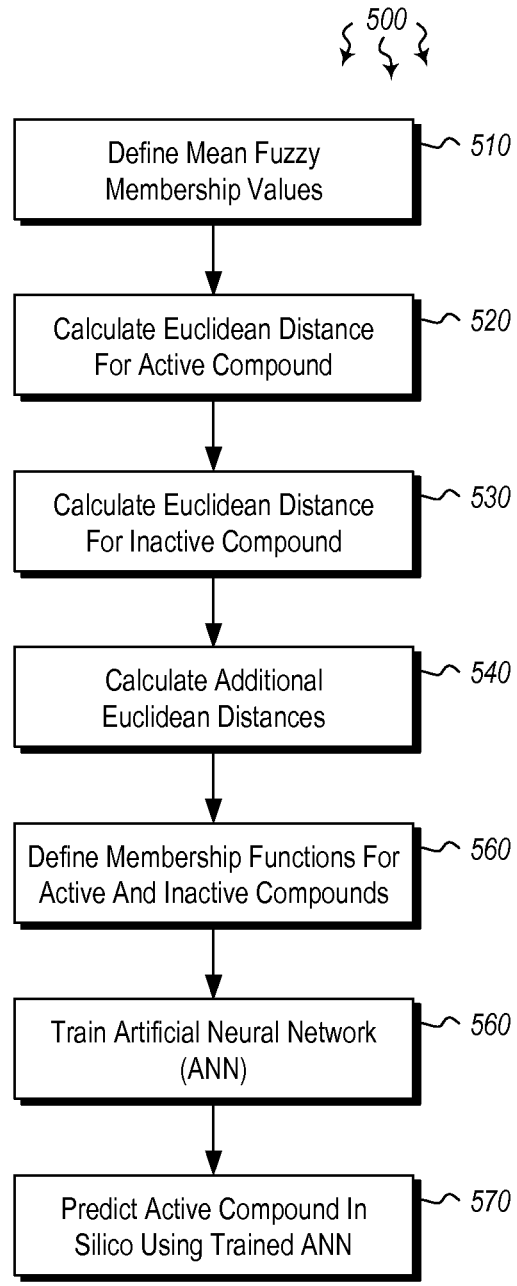
FIG. 5 illustrates a flowchart of an example method for identifying active compounds for a targeted medium from a library of compounds.
Figure 6:
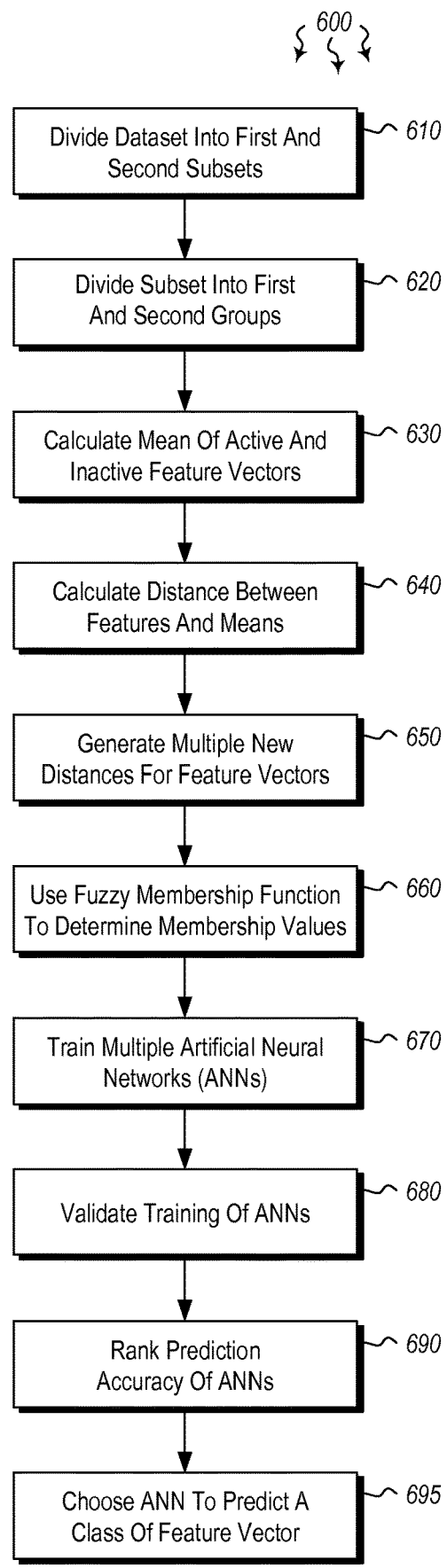
FIG. 6 illustrates a flowchart of an example method for identifying classes of feature vectors.

In view of the systems and architectures described above, methodologies that may be implemented in accordance with the disclosed subject matter will be better appreciated with reference to the flow charts of FIGS. 5 and 6. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 5 illustrates a flowchart of a method 500 for identifying active compounds for a targeted medium from a library of compounds. The method 500 will now be described with frequent reference to the components and data of environment 400 of FIG. 4. It should be noted that, like computer system 101 of FIG. 1, computer system 401 of FIG. 4 includes a hardware processor 402 and hardware-based memory 403, and may likewise be a local or distributed computer system including a cloud computer system.

Method 500 includes using at least one known active compound 405 and at least one known inactive compound 406 to define a mean Fuzzy membership value 407 for active compounds and a mean Fuzzy membership value 408 for inactive compounds (510). For example, the Fuzzy membership value determining module 404 may access known active compounds 405 and known inactive compounds 406 from a data store (e.g. data store 120 of FIG. 1). The Fuzzy membership value determining module 404 may determine a mean Fuzzy membership value 407 for active compounds and a mean Fuzzy membership value 408 for inactive compounds. The mean Fuzzy membership value may indicate a membership value for the average of multiple feature vectors.

Method 500 further includes calculating a Euclidean distance from the known active compound to the mean Fuzzy membership value for active compounds and to the mean Fuzzy membership value for inactive compounds (520), and further calculating a Euclidean distance from the known inactive compound to the mean Fuzzy membership value for active compounds and to the mean Fuzzy membership value for inactive compounds (530). This Euclidean distance between the known active compound 405 and the mean Fuzzy membership values for active and inactive compounds may indicate how far the currently selected (known active compound) is from the average value. In other words, is the selected known compound close to the average or far from the average value. The calculating module 409 of computer system 401 may thus calculate Euclidean distance 410 for active compounds, Euclidean distance 411 for inactive compounds, and may further calculate other Euclidean distances 412 for other compounds.

Method 500 further includes calculating at least two new Euclidean distances for the known active compound and the known inactive compound (540), and defining a membership function for an active compound and a membership function for an inactive compound. This defined membership function may include a variety of different membership functions including, for example, the inverse of the natural exponential function having the exponent as the square of the Euclidian distance of the compound to the mean Fuzzy membership value for the compound (550). This membership function may thus be defined and subsequently used to train artificial neural networks on how to identify compounds as being active or inactive. The membership function defining module 413 of computer system 401 may define or derive the membership function 414 for active compounds as well as the membership function 415 for inactive compounds using the calculated Euclidean distances.

The ANN training module 416 then trains at least one artificial neural network 417 to predict active and inactive compounds in silico (560), and the prediction module 418 (e.g. a simulator) predicts at least one active compound 421 in silico using the trained ANN (570). The predicted active compound 421 is then designated as being active and is given an active label (as shown in 210 of FIG. 2). In some cases, the artificial neural network may predict the active compound in silico by comparing physical structures and chemical characteristics of the library of compounds to those of a target subset of compounds.

Still further, at least in some cases, multiple different ANNs may be trained by the ANN training module 416 to identify active and inactive compounds in silico. This plurality of ANNs may be used to define a mean Fuzzy membership value for active compounds and a mean Fuzzy membership value for inactive compounds. The plurality of ANNs may be trained by having as inputs the active compounds and the inactive compounds and as outputs the membership values for the active compounds and inactive compounds. By using known active or inactive compounds, the ANN may be trained to correctly and properly identify compounds as being active or inactive, and will not be as susceptible to misclassifications.

FIG. 6 illustrates a flowchart of a method 600 for identifying classes of feature vectors. The method 600 will now be described with frequent reference to the components and data of environment 400 of FIG. 4.

Method 600 includes dividing a dataset into at least two subsets including a first subset and a second subset, wherein one or more active and inactive feature vectors are defined in the first subset (610). For example, the computer system 401 may divide a dataset (e.g. library 201 of FIG. 2) into two subsets (e.g. 204 and 208). The feature vector defining module 422 may define active feature vectors 423 and inactive feature vectors 424 for the first subset. The computer system may further divide the first subset further into a first group and a second group (e.g. training and validation groups), wherein the first group and the second group comprise an approximately equal number of active 423 and inactive 424 feature vectors (620).

The calculating module 409 of computer system 401 then calculates a mean of the active feature vectors 423 and a mean of the inactive feature vectors 424 in the first group (630). The calculating module 409 further calculates the distance between each of the active and inactive feature vectors and the mean of the active feature vectors 423 and the mean of the inactive feature vectors 424 in the first group (640). The calculating module 409 also calculates at least two new distances for at least one feature vector in the first group (650).

The membership function defining module 413 uses a Fuzzy membership function (e.g. 414) to determine a membership value for each of the active and inactive feature vectors in the first group (660). The ANN training module 416 trains multiple artificial neural networks 417 using the determined membership values. The training inputs to the ANNs are the active 423 and inactive feature vectors 424, and the training outputs are the membership values for each of the active 423 and inactive feature vectors 424 in the first group (670). The computer system 401 validates the training of the ANNs using the second group (e.g. the validation group) (680). The ranking module 419 then ranks the prediction accuracy of the ANNs (690), and the ANN selection module 420 chooses at least one ANN to predict in silico the class of feature vector for at least one untested feature vector in the dataset (695).

Thus, in this manner, artificial neural networks may be used to predict in silico the class of feature vector for at least one untested feature vector in the dataset. When referring to calculations of feature vectors, each active class is said to include all of the active compounds in a dataset, and each inactive class is said to include all of the inactive compounds in the dataset. In a feature space, the mean of the vectors of compounds belonging to the same class is defined as the class center. Instead of setting the output for the ANNs to 1 or 0, fuzzy boundaries may be used which allows the output to take a value in the range [0, 1]. As such, a compound can belong to both classes, but with a different level of membership (e.g. strong active, weak active, etc.). During testing, an unlabeled compound is identified as active if its membership value to the active class is greater, and is identified as inactive if its membership value to the inactive class is greater.

Based on the distance between any compound and a class center, these membership functions take values in the range (0, 1], with 1 representing a strong relation to the class, and 0 representing no relation. In general, the distance in the feature space between an active compound and the center of the active class is shorter than the distance between the active compound and the center of the inactive class. Using defined membership functions, the membership value of an active compound, for example, to the active class is greater than its membership value to the inactive class. Using the same logic, the membership value of an inactive compound to the inactive class should be greater than to the active class.

Figure 7:
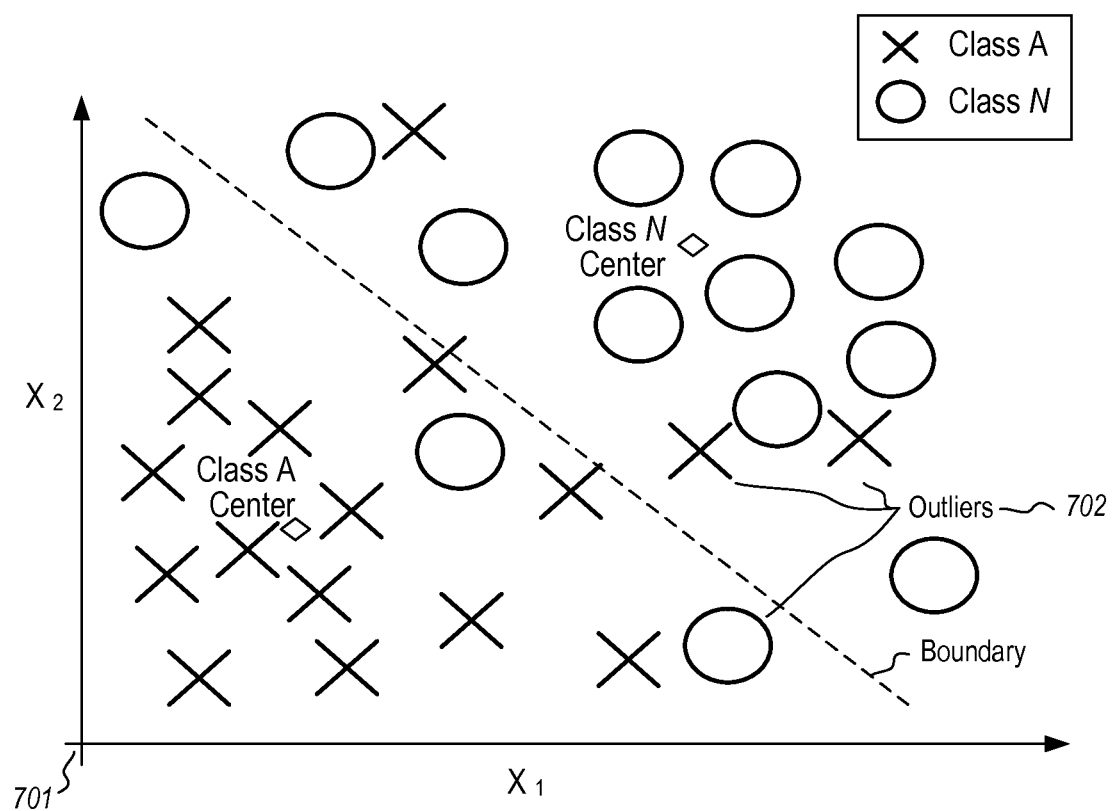
FIG. 7 illustrates an embodiment in which compounds are shown belonging to active and inactive classes along with outliers in a two dimensional Euclidean space.

However, as illustrated in graph 701 of FIG. 7, due to the overlap between the active and inactive compounds in the feature space, some labeled compounds might have a smaller distance to the center of their class than to the center of the other class. In this case, the compounds are called "outliers," 702 and the ANNs may perform suboptimally if trained with these outliers without modifying their membership values.

In order to determine whether an active compound is an outlier, the difference between its membership values to the active and inactive classes is first calculated by the calculating module 409. If the value of difference between membership values is negative, then the active compound is an outlier and will be labeled as weak active; otherwise, the compound is considered a strong active. On the other hand, an inactive compound is considered an outlier (i.e., weak inactive) if the calculated difference is negative. If the calculation results in a positive value, the inactive compound is considered a strong inactive.

The next step is to group the outliers in separate clusters based on their membership value to their corresponding class. This takes the outliers and places them far from their opposite class by changing their membership value to that opposite class. As such, the weak active compounds, for example, are grouped in a number of clusters based on their membership value to the active class, and they are clustered together by changing the value of their membership value to the inactive class. Similar logic and calculations apply to the weak inactive compounds.

Figure 8:
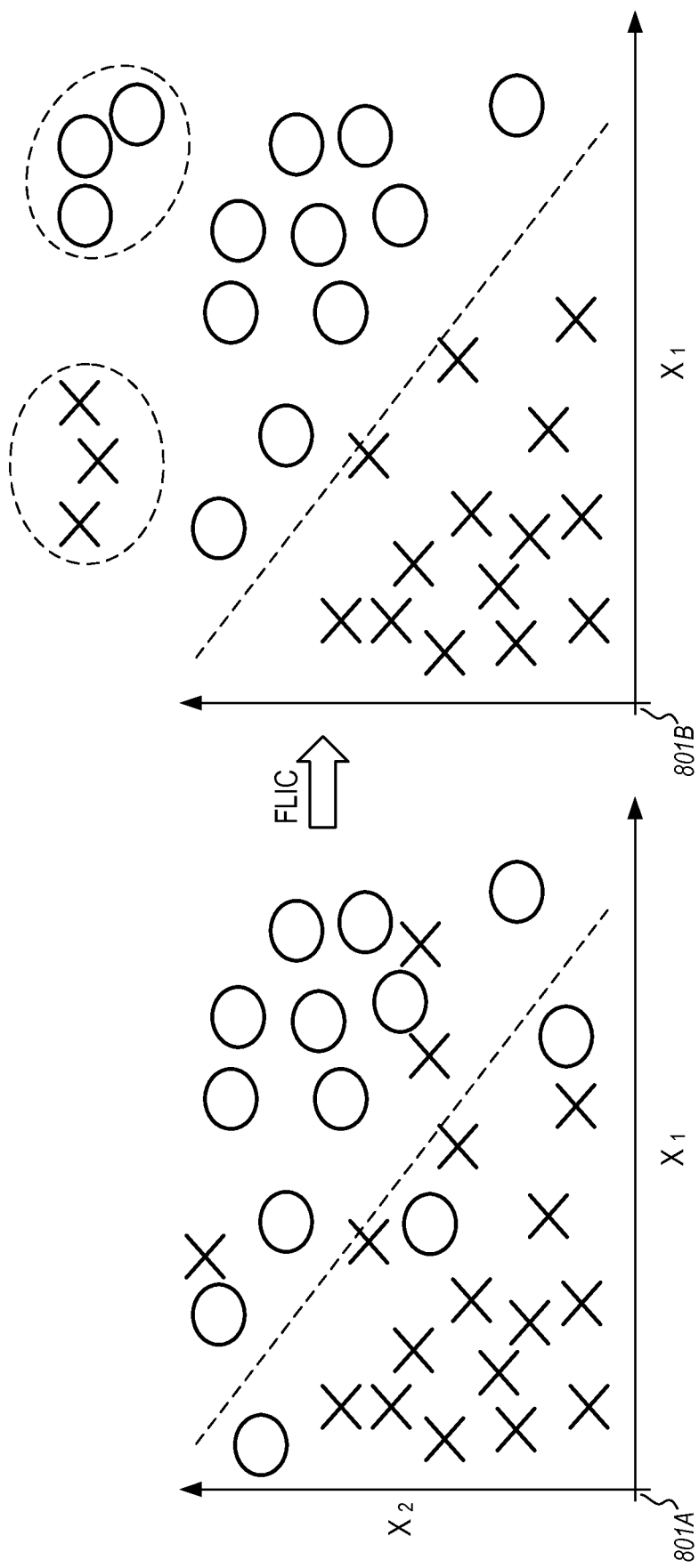
FIG. 8 illustrates an embodiment in which outliers are grouped in separate clusters.

One clustering embodiment is Fuzzy logic interval clustering (FLIC) with four clusters, (i.e., FLIC 4-Clusters). In this embodiment, the clusters represent the weak active, weak inactive, strong active, and strong inactive, where calculations are made to determine which compounds belong to each cluster. Next, the distance of each compound to its opposite class is modified, and the corresponding membership value is recalculated. The new distance of the active compounds to the inactive class center is modified, as is the distance of the inactive compounds to the active class center. This only increases the distance of the weak compounds with respect to their opposite class, without changing the distance between the weak compounds and their own class nor the distances of the strong compounds. This modification makes the membership value of the outliers to their opposite class lower than their membership value to their own class, as they are supposed to be. Graphs 801A and 801B FIG. 8 shows an illustration of FLIC 4-Clusters and how the outliers are grouped in separate clusters (as demonstrated in the change from graph 801A to 801B).

As mentioned above, the FLIC method may be used with substantially any number of clusters. Indeed, using the same line of logic as with the FLIC 4-cluster, the compounds can be grouped into any number, M, of clusters. At least in some cases, two of the clusters may be for the strong active and strong inactive compounds, and the remaining M-2 for the weak compounds. As such, the range of the membership value of the active and inactive classes is divided into M-2 partitions and the compounds are clustered accordingly. Thus, in this manner, FLIC may be used with different numbers of clusters At least in some embodiments, the class of feature vector for at least one untested feature vector may be verified after predicting the class of feature vector for at least one untested feature vector in silico. The verification may substantiate the prediction and may be used as feedback for future predictions. In some cases, the computer system 401 may generate at least two new distances for a feature vector in the dataset, and that feature vector may be an active feature vector having a shorter distance to the mean of the inactive feature vectors than to the mean of the active feature vectors, as explained above. Similarly, the feature vector in the dataset may be an inactive feature vector having a shorter distance to the mean of the active feature vectors than to the mean of the inactive feature vectors.

The embodiments described herein may be implemented in a variety of different manners. The embodiments are capable of identifying classes of feature vectors when the feature vectors from different classes overlap significantly in the multidimensional feature space. For example, if a specified feature vector has N elements, then that feature vector could be represented by a point in the N-dimensional feature space. When a large number of compounds, say Nc, is available combining both classes, then those compounds will be represented by Nc points in the feature space, and those points will overlap in such a way that it becomes difficult for any algorithm to separate different classes into different clusters. Since neural networks have the ability to form non-linear boundaries in multidimensional feature space, and as Fuzzy logic has the ability to handle overlapping of data even with incomplete information about the features, the embodiments described herein may be used not only for drug classification, but also for solving other problems where data overlaps significantly in the feature space. Some examples include automated speech, voice recognition, facial recognition, aircraft identification in a hostile environment, drug discovery or medical diagnosis.

Automated speech: Identification of the spoken words, even when only one speaker is used to train and test the system, is a generic problem of pattern classification. The same problem exists in the fields of speaker recognition. Current implementations do not have proper means to train a system with features from spoken words so that the machine could recognize those features when the words are spoken differently by the same people. The natural variances that occur when the same word is spoken by the same user at different times are still difficult to accommodate by a trained machine. As the embodiments described herein have demonstrated the ability to function effectively when the features from the same class of compounds vary significantly, the systems herein can improve the performance of a speech recognition or speaker identification system.

Face recognition: Identification of human being from his or her facial features is a very difficult problem in pattern classification. If the subject is static, and the camera is set at the right position then it might be possible to take that snapshot and identify that person by comparing images with a stored data base. However, when the subject is moving and the camera can see only a portion of the face, it is very difficult to recognize that person from a single snapshot. In most cases, workers in this space have to work with only partial information to identify a person. The systems described herein can account for incomplete and noisy information in a self-consisted manner, rendering them useful face recognition. The combination of fuzzy logic, neural networks, and the calculations and algorithms described herein may aid significantly in the face recognition problem.

Aircraft identification in a hostile environment: Distinguishing between friendly and enemy aircraft in a hostile environment is a challenging task. Even today, the military suffers from friendly fire, despite all the sophisticated technologies at their disposal. Using the embodiments described herein, electromagnetic or radar signature of the target under investigation may be compared with a database in identifying the target in real time. Because of technologies available to reduce the magnitude of the radar returns from a target aircraft, the systems herein work with ever decreasing signal strength from an aircraft. As a result, the features extracted from these aircraft are often noisy and as well as contaminated with high variances. The algorithms described herein have shown that they can accommodate large variances from the same class even when all the classes overlap with each other in the feature space. As such, the algorithms described herein may substantially improve the performance in aircraft classification in a hostile environment.

Medical diagnosis: Diagnosis of any form of cancer at an early stage can save lives. Identifying cancer at an early stage, however, is difficult as human vision is limited in its ability to view anomalies in X-rays or through other viewing means. Hence, several automated schemes are now available, but these automated schemes do not capture any small difference in the features extracted from the image, and then meaningfully analyze an area around that point of interest to identity the cell condition properly. The embodiments described herein can train a neural network with Fuzzy logic, and when the desired outputs from the networks are modified to account for overlap, the systems perform classification very well. By extracting proper features from X-rays or other useful images, and by training the networks with the methods herein, the chances of detecting cancer at an early stage may be substantially increased.

Accordingly, methods, systems and computer program products are provided which enhance the efficiency of computer assisted high throughput screening in drug discovery or in other fields. In one embodiment, a computer system includes the following: a library of compounds, a targeted medium, and automated high throughput compound screening equipment. The computer system is configured to screen at least a portion of the library of compounds in silico using Fuzzy logic and interval clustering to predict at least one active compound. The library of compounds may be a drug library, a nucleic acid library, a siRNA library, an miRNA library, or some other type of library. The targeted medium may be a chemical compound, a protein, a nucleic acid or a lipid. The targeted medium may include any combination of chemical compounds, lipids, proteins, and nucleic acids. Active and inactive classes within the system may be equal or disproportionate. Indeed, in some cases, the portion of a compound library may be less than 50% of the compound library (or less than 60%, 70% or 80%).

Accordingly, methods, systems and computer program products are provided which identify active compounds for a targeted medium from a library of compounds. Moreover, methods, systems and computer program products are provided which identifying classes of feature vectors for use in identifying active compounds.

The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

We claim:
1. A computer system, comprising:
one or more processors;
system memory; and
a receiver that receives high throughput screening (HTS) data for a first subset of compounds that have been HTS-screened, wherein receiving the HTS data causes the computer system to:
determine labels for one or more compounds based on labels identified in the HTS-screened compounds as being part of an active class or part of an inactive class;
access one or more chemical features corresponding to the HTS-screened compounds;
apply one or more Fuzzy logic membership functions to calculate membership values for active and inactive compounds to determine a degree to which each compound belongs to the active class or to the inactive class;
train at least one artificial neural network (ANN) to identify active compounds in silico based on the membership values calculated using the one or more Fuzzy logic membership functions, wherein the membership values are used as outputs to train the at least one artificial neural network;
process at least a second subset of compounds in silico to identify active and inactive compounds using the at least one trained artificial neural network;
defining active feature vectors and inactive feature vectors in at least a portion of a dataset;
finding a mean of the active feature vectors and a mean of the inactive feature vectors from the at least a portion of the dataset;
calculating the distance between a singular active feature vector and the mean of the active feature vectors and the distance between singular inactive feature vectors and the mean of the inactive feature vectors from the at least a portion of the dataset;
generating at least two new distances for at least one feature vector in the at least a portion of the dataset,
using a Fuzzy membership function to find membership values for the active feature vectors and for the inactive feature vectors in the at least a portion of the dataset, and
upon training a plurality of artificial neural networks, where the inputs are the active feature vectors and the inactive feature vectors and the outputs are the membership values for the active feature vectors and for the inactive feature vectors in the at least a portion of the dataset, predicting, in silico, at least one untested feature vector in the dataset to be an active feature vector using the trained plurality of artificial neural networks.

2. The computer system in claim 1, wherein the chemical features for each compound are implemented as desired inputs to train the ANN.

3. The computer system in claim 1, further comprising the computer system generating a plurality of artificial neural networks with random number of hidden layers and nodes.

4. The computer system in claim 3, wherein the plurality of artificial neural networks is taught to identify active compounds.

5. The computer system in claim 1, wherein a plurality of artificial neural networks are used to predict in silico a class of feature vector for at least one untested feature vector in the HTS data.

6. The computer system in claim 5, further comprising the computer system verifying the predicted class of feature vector for the at least one untested feature vector.

7. The computer system in claim 1, wherein generating at least two new distances for at least one feature vector in the at least a portion of the dataset comprises the at least one feature vector in the at least a portion of the dataset comprising an active feature vector having a shorter distance to the mean of the inactive feature vectors than to the mean of the active feature vectors.

8. The computer system in claim 1, wherein generating at least two new distances for at least one feature vector in the at least a portion of the dataset, the at least one feature vector in the at least a portion of the dataset comprising an inactive feature vector having a shorter distance to the mean of the active feature vectors than to the mean of the inactive feature vectors.

9. The computer system in claim 1, wherein the at least one untested feature vector predicted in silico to be an active feature vector is verified to be an active feature vector.

10. A computer program product comprising one or more recordable-type computer-readable storage devices having stored thereon computer-executable instructions that, when executed by one or more processors of a computer system, cause the computer system to execute a method for identifying active compounds for a targeted medium from a library of compounds, the method comprising:
using at least one known active compound and at least one known inactive compound to define a mean Fuzzy membership value for active compounds and a mean Fuzzy membership value for inactive compounds;
calculating a Euclidean distance from the known active compound to the mean Fuzzy membership value for active compounds and to the mean Fuzzy membership value for inactive compounds;
calculating a Euclidean distance from the known inactive compound to the mean Fuzzy membership value for active compounds and to the mean Fuzzy membership value for inactive compounds;
calculating at least two new Euclidean distances for the known active compound and the known inactive compound;
defining a membership function for an active compound and a membership function for an inactive compound, where the membership function is the inverse of the natural exponential function having the exponent as the square of the Euclidian distance of the compound to the mean Fuzzy membership value for the compound;
training at least one artificial neural network to predict active and inactive compounds in silico; and
predicting at least one active compound in silico using the trained at least one artificial neural network.

11. The computer program product of claim 10, wherein the artificial neural network predicts the at least one active compound in silico by comparing physical structures and chemical characteristics of the library of compounds to those of a target subset of compounds.

12. The computer program product of claim 10, wherein a plurality of known active compounds and inactive compounds are used to define a mean Fuzzy membership value for active compounds and a mean Fuzzy membership value for inactive compounds.

13. The computer program product of claim 10, wherein a plurality of artificial neural networks are trained to identify active and inactive compounds in silico.

14. The computer program product of claim 13, wherein the plurality of artificial neural networks is trained by having as inputs the active compounds and the inactive compounds and as outputs the membership values for the active compounds and inactive compounds.

15. A method, implemented at a computer system that includes at least one processor, for, the method comprising:
dividing a dataset into at least two subsets including a first subset and a second subset, wherein one or more active and inactive feature vectors are defined in the first sub set;
dividing the first subset further into a first group and a second group, wherein the first group and the second group comprise an approximately equal number of active and inactive feature vectors;
calculating a mean of the active feature vectors and a mean of the inactive feature vectors in the first group;
calculating the distance between each of the active and inactive feature vectors and the mean of the active feature vectors and the mean of the inactive feature vectors in the first group;
generating at least two new distances for at least one feature vector in the first group;
using a Fuzzy membership function to determine a membership value for each of the active and inactive feature vectors in the first group;
training a plurality of artificial neural networks, wherein training inputs to the artificial neural networks comprise the active and inactive feature vectors, and wherein training outputs comprise the membership values for each of the active and inactive feature vectors in the first group;
validating the training of the plurality of artificial neural networks using the second group;
ranking the prediction accuracy of the plurality of artificial neural networks; and
choosing at least one artificial neural network to predict in silico the class of feature vector for at least one untested feature vector in the dataset.

16. The method of claim 15, wherein the method is applied to perform one or more of the following: drug discovery, automated speech, voice recognition, facial recognition, aircraft identification in a hostile environment or medical diagnosis.

17. The method of claim 15, wherein a plurality of artificial neural networks are used to predict in silico the class of feature vector for at least one untested feature vector in the dataset.

18. The method of claim 17, wherein the class of feature vector for at least one untested feature vector is verified after predicting the class of feature vector for at least one untested feature vector in silico.

* * * * *